UNITED STATES PATENT OFFICE.

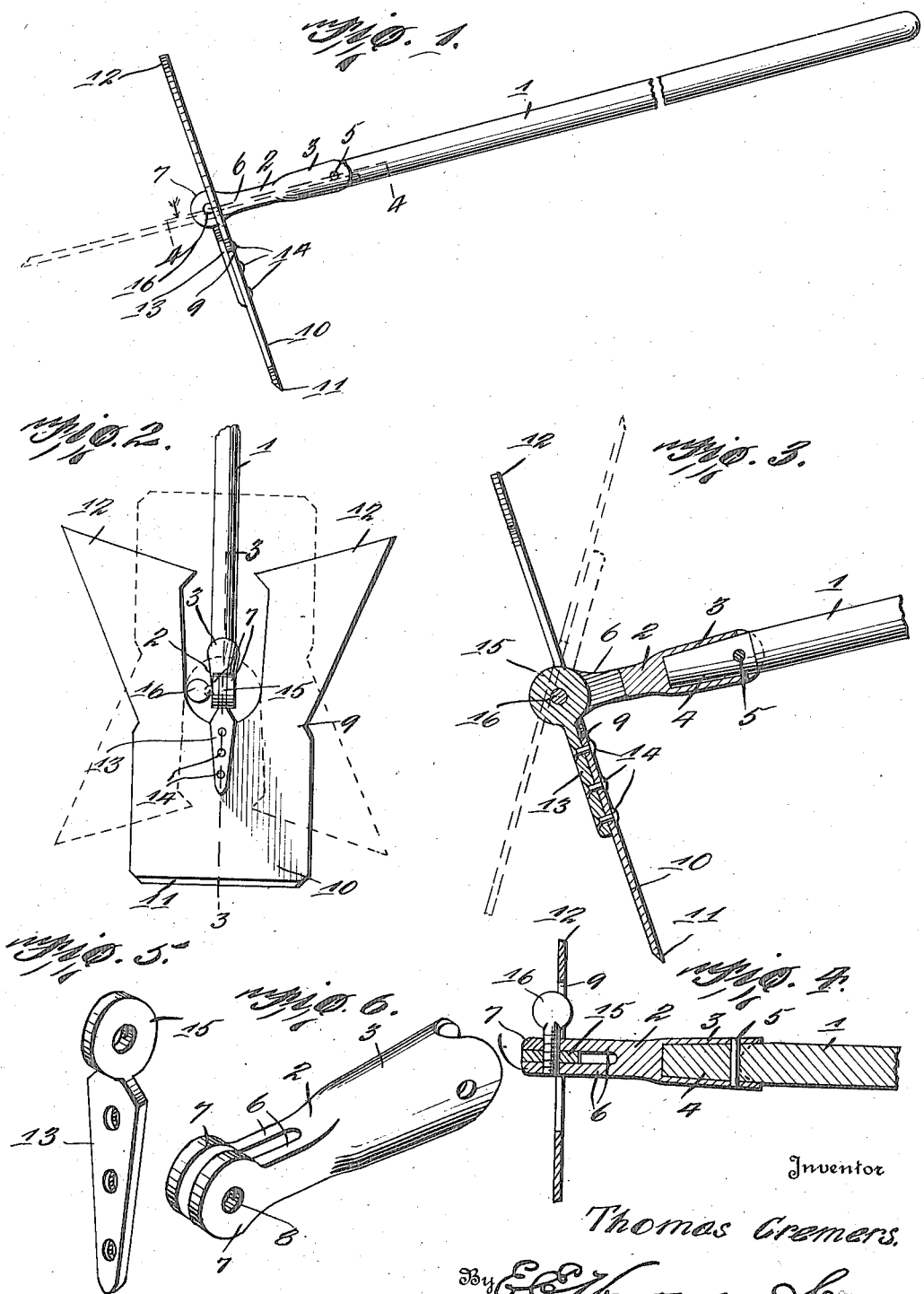

THOMAS CREMERS, OF ALBANY, MINNESOTA.

COMBINATION GARDEN-TOOL.

1,266,921.     Specification of Letters Patent.     Patented May 21, 1918.

Application filed January 5, 1917. Serial No. 140,785.

*To all whom it may concern:*

Be it known that I, THOMAS CREMERS, a citizen of the United States, residing at Albany, in the county of Stearns and State of Minnesota, have invented certain new and useful Improvements in Combination Garden-Tools, of which the following is a specification, reference being had therein to the accompanying drawing.

This invention relates to a combination garden tool and has for its principal object the production of a device of this nature which may be regulated so as to be used as a hoe, a shovel or a hiller.

Another object of this invention is in the production of a blade which is adapted to be struck out of a single sheet of metal so as to form a body-portion provided with a bifurcated portion.

A still further object of this invention is in the production of a blade provided with means whereby the same may be pivotally adjusted upon a handle.

With these and other objects in view, this invention consists of certain novel combinations, constructions and arrangements of parts as will be hereinafter fully described and claimed.

In the drawings:

Figure 1 is a side elevation of the device.

Fig. 2 is a front elevation of the device.

Fig. 3 is a section taken on the line 3—3 of Fig. 2.

Fig. 4 is a section taken on the line 4—4 of Fig. 1.

Fig. 5 is a detail perspective view of the blade-attaching plate.

Fig. 6 is a detail perspective view of the shank.

By referring to the drawings by numerals, it will be seen that 1 designates a handle upon which is mounted the shank 2. This shank 2 is provided with the sleeve portion 3 which is adapted to receive the end 4 of the handle 1, which end 4 is held in place by means of the rivet 5. This shank is provided with the bifurcated portion 6 which is provided with the plates 7, which plates are provided with the eyes 8.

Mounted upon the shank 2 is the blade 9. This blade 9 is provided with the body-portion 10 upon which is beveled the cutting edge 11. This body-portion 10 is provided with the hilling blades 12. It will be seen by referring especially to Fig. 2 that the body-portion 10 is substantially square in shape, whereas the hilling blades 12 are shaped similar to the mold-board of a plow. This blade 9 is pivotally held in engagement with the shank 2 by means of the plate 13 which is held to the blade by means of the rivets 14. This plate 13 is provided with an eye-portion which extends at right angles to the face of the body-portion 10. This eye-portion 15 is adapted to fit between the plates 7 and is held therein by means of the set-screw 16. It will be seen that this set-screw is adapted to force the plate 7 to bind upon the eye-portion 15 as is clearly shown in Fig. 4, whereby the blade 9 may be held in any desired position.

When it is desired to use this device as a hoe, the blade 9 will be adjusted so as to extend at right angles to the handle 1, as is demonstrated in Fig. 1. It will also be seen by referring to Fig. 1 that if the blade 9 is allowed to extend in the same plane with the handle 1, a shovel has been produced, as is clearly shown in the dotted-line position of the blade 9.

In order to use this device as a hiller, it is necessary to turn the device over as illustrated in Fig. 1, when the blades 12 may engage the ground for hilling or marking purposes. It, of course, should be understood that when the same is to be used as a hiller or marker, the blade 9 may be set at any angle which may best suit the operator of the device.

Having thus described my invention, what is claimed as new is:

As a new article of manufacture, a blade of the class described struck from a single sheet of metal so that one portion thereof will form a substantially square body portion provided with a beveled cutting edge, triangular shaped blades divergingly extending from said body portion, the outer edges of said blades diverging from each other, the cutting edges of said blades converging toward each other so as to form points opposite each other, the inner edges of said blades running substantially parallel with each other whereby said blades substantially conform to the usual shape of a mold-board upon a plow.

In testimony whereof I hereunto affix my signature.

THOMAS CREMERS.